Sept. 30, 1969 C. J. SNYDER 3,470,470

MULTIPLE-TRACK MAGNETIC PULSE RECORDING OF RELATED QUANTITIES

Filed Aug. 12, 1963 2 Sheets-Sheet 1

WITNESSES:
John G. Chopp
James F. Young

INVENTOR
Carl J. Snyder
BY C. L. Freedman
ATTORNEY

MULTIPLE-TRACK MAGNETIC PULSE RECORDING OF RELATED QUANTITIES 3,470,470
MULTIPLE-TRACK MAGNETIC PULSE RECORDING OF RELATED QUANTITIES

Carl J. Snyder, Raleigh, N.C., assignor to Westinghouse Electric Corporation, East Pittsburgh, Pa., a corporation of Pennsylvania Filed Aug. 12, 1963, Ser. No. 301,504
Int. Cl. G01r 7/12
U.S. Cl. 324—141 3 Claims

ABSTRACT OF THE DISCLOSURE

Quantities such as real power, leading reactive power, lagging reactive power and time are magnetically recorded in tape and are processed to produce a resultant such as volt amperes.

This invention relates to electroresponsive recording of information and has particular relation to procedures and apparatus for ascertaining a resultant dependent on plural quantities.

In many fields, it is desirable to provide information dependent on plural measured quantities. For example, information such as volt-amperes is derived from measurements of real and reactive power. As a further example, totalized power is derived from plural measurements of individual powers flowing in electric circuits.

In my Patent 3,059,239, time information and measured information are magnetically recorded. As disclosed in my patent, a magnetic tape is fed past a magnetic recording station at which a magnetic record can be formed in the magnetic tape. A common motor feeds the magnetic tape past the recording station and supplies time information to the station.

In accordance with the invention, records of plural quantities from which information is desired are recorded in separate tracks of a magnetic member. In a preferred embodiment of the invention, a magnetic tape similar to that utilized in the aforesaid Snyder patent is provided, and is arranged to receive one track for each of a plurality of quantities. Thus one track may receive time information and other tracks may receive information concerning quantities to be totalized or otherwise combined. The invention includes a method by which the desired information is magnetically recorded in tracks and the magnetic records are thereafter combined to provide resultant information.

It is therefore an object of the invention to provide apparatus for forming a magnetic record including a plurality of tracks of magnetically-recorded information.

It is also an object of the invention to provide apparatus including a magnetic member for receiving a magnetic record in a plurality of tracks and apparatus for totalizing information in the tracks.

It is an additional object of the invention to provide apparatus including a magnetic tape for receiving a magnetic record in tracks representing real, lagging and reactive volt-amperes derived from an electrical circuit and apparatus for combining information derived from such tracks.

It is a further object of the invention to provide an improved method for recording information magnetically in a plurality of tracks and thereafter combining the information to provide a desired resultant.

Other objects of the invention will be apparent from the following description taken in conjunction with the accompanying drawing in which.

Figure 1:
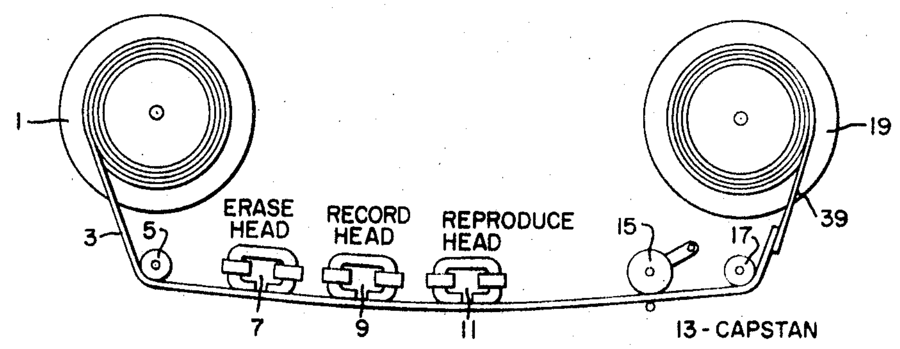
FIGURE 1 is a schematic view of a magnetic recorder suitable for the invention.

Referring to the drawing, FIG. 1 shows a magnetic recorder. The recorder illustrated in FIG. 1 includes a payout reel 1 on which a flexible elongated magnetic member 3 may be wound. The magnetic member 3 may be of any suitable material capable of receiving and retaining a magnetic record therein. It may take the form of a flexible ribbon of magnetically-hard steel, but preferably it is in the form of a magnetic tape having a base constructed of a material such as paper or a plastic. The base is coated with a thin coating of magnetically-hard material. Such tapes are well known in the art.

The magnetic tape leaving the payout reel is guided in a predetermined path by means of a guide roller 5, an erase head 7, a record head 9, a reproduce head 11, a capstan 13 against which the tape is biased by means of a suitable biasing roller 15, and a guide roller 17 to a takeup reel 19. It will be understood that the various reels and rollers are mounted on a suitable supporting structure (not shown) for rotation about their respective axes.

The erase head 7 comprises an electromagnet which when energized establishes a magnetic field in the path through which the magnetic tape 3 passes. Thus, in one type of conventional magnetic recorder the erase head has its windings energized from an alternating source of current which may have a frequency of the order of 30,000 cycles per second. When the magnetic tape passes through the field produced by the erase head, any magnetic record previously applied to the tape is removed by the field.

The record head 9 also is in the form of an electromagnet for establishing a magnetic field in the path through which the magnetic tape moves. The windings of the electromagnet are energized in accordance with a quantity to be measured.

The reproduce head 11 is illustrated as another electromagnet similar to the record head. If the magnetic tape has a magnetic record therein, the movement of the tape past the reproduce head induces a voltage in the windings of the reproduce head which is representative of the magnetic record carried by the tape. The output of the windings may be supplied to suitable translating means in the manner hereinafter set forth. The heads 7, 9 and 11 are associated with one track of the magnetic tape 3.

The number of heads or electromagnets may be reduced by utilizing one of the heads for more than one function. For example, the record head also may be employed for reproduction purposes.

The capstan 13 is rotated at a substantially uniform rate for the purpose of advancing the magnetic tape past the heads at a substantially uniform rate. The takeup reel 19 is biased to take up the magnetic tape as it is fed by the capstan.

After the magnetic tape is fully wound on the takeup reel with a record therein, it may be rewound on the payout reel in a manner well understood in the art. The rewound magnetic tape then may be fed for a second time past the heads for the purpose of reproducing the record formed therein or if desired the magnetic tape may be removed for storage purposes.

Figure 2:
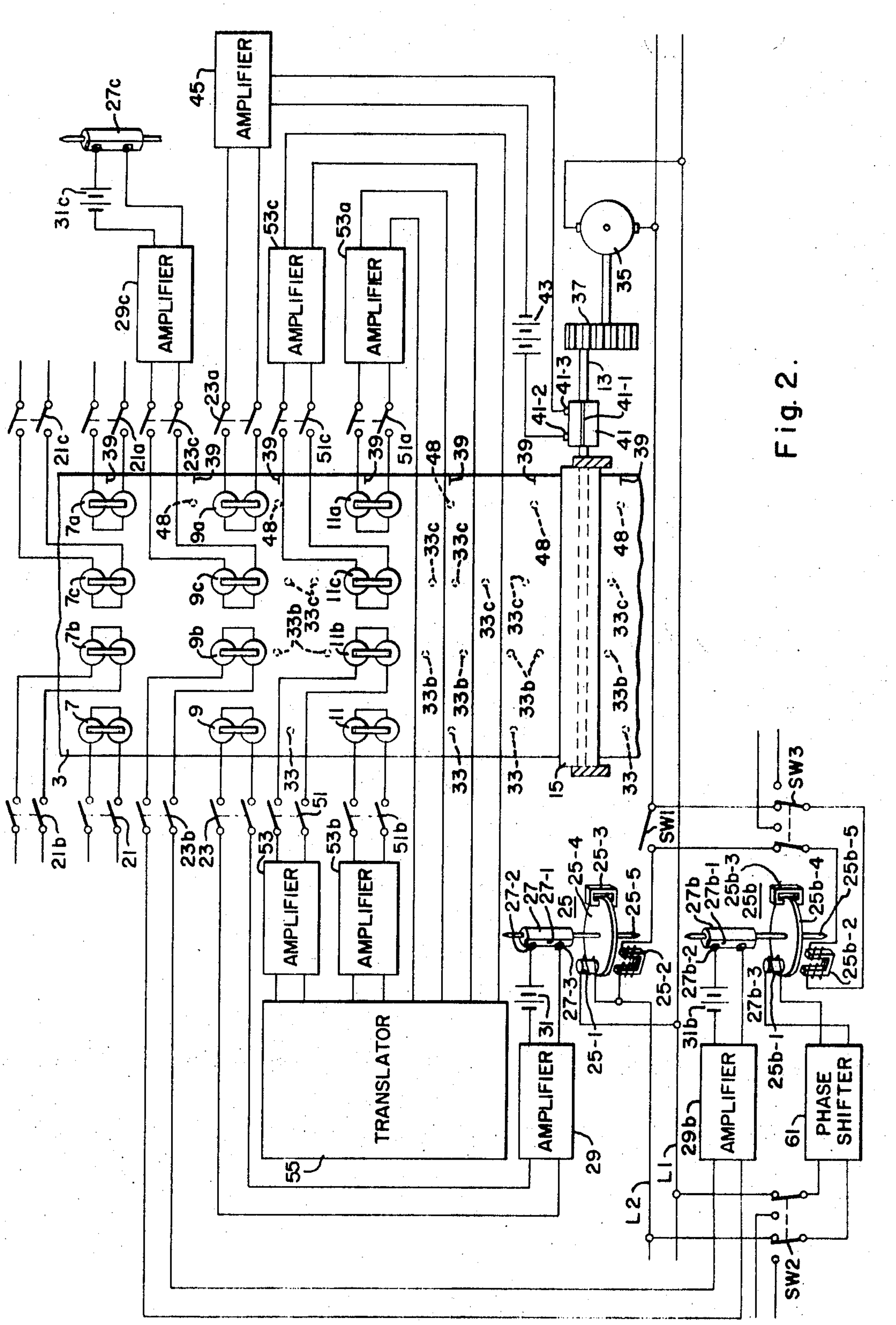
FIG. 2 is a schematic view showing a portion of the recorder of FIG. 1 associated with components for supplying information thereto and components for utilizing information therefrom.

FIGURE 2 shows a portion of the magnetic tape 3 together with the erase head 7, the record head 9 and the reproduce head 11. The erase head 7 may be connected through a suitable two-pole single-throw switch 21 to a high-frequency source of alternating current (not shown). It will be recalled that such a source may have a frequency of the order of 30,000 cycles per second.

The record head 9 may be connected through a two-pole single-throw switch 23 to a measuring unit 25 having an output representative of the quantity to be measured.

The unit 25 is responsive to power flowing in an electrical circuit represented by conductors L1 and L2. For example, this circuit may be a single-phase alternating-current circuit operating at a frequency of 60 cycles per second for the purpose of supplying power from a generator to a load. The unit 25 has a stator which includes an electromagnet providing a voltage pole 25–1 having a winding connected for energization in accordance with the voltage across the conductors L1 and L2. Current poles 25–2 are provided with windings connected for energization in accordance with current flowing in the conductor L2. A permanent magnet 25–3 also forms part of the stator.

The unit 25 also includes a rotor represented by an electroconductive armature or disc 25–4 which is mounted for rotation relative to the stator on a shaft 25–5. The armature 25–4 is positioned in the air gap of the electromagnet formed by the poles 25–1 and 25–2 and in the air gap of the permanent magnet 25–3. The unit 25 thus takes the form of a conventional watthour meter and the rotor rotates at a rate dependent upon power flowing in the conductors L1 and L2. For present purposes a switch SW1 in the conductor L2 is assumed to be closed.

The rotation of the shaft 25–5 is utilized to produce pulses occurring at a frequency dependent on the rate of rotation of the shaft. Mechanism for producing such pulses is well known in the art and is represented in FIG. 2 by a commutator 27. The commutator 27 may be constructed of an insulating material such as phenolic resin which is mounted on the shaft 25–5 for rotation therewith and which has an electroconductor bar 27–1 embedded in its surface and extending parallel to the shaft 25–5. Two brushes 27–2 and 27–3 are positioned to engage the commutator 27. It will be noted that these brushes are connected by the bar 27–1 once for each rotation of the shaft 25–5. The brushes are connected to the input terminals of an amplifier 29 in series with a suitable source of voltage represented by a battery 31. The amplifier 29 may be utilized to amplify the pulse received from the battery 31 through the commutator 27, to provide a conventional bias if a bias is utilized in the recording process and to shape the pulse as desired. The output of the amplifier is connected to the record head 9 through the switch 23.

From the foregoing discussion it is clear that as the shaft 25–5 rotates pulses are applied to the record head 9. Each of the pulses is magnetically recorded in the magnetic tape 3. Although such pulses are invisible to the eye, positions of representative pulses or bits 33 are illustrated in FIG. 2. The spacing of the pulses depends substantially on the rate at which power is supplied by the conductors L1 and L2.

A desirable system for erasing and recording pulses in a magnetic tape is set forth in this copending patent application of Kenneth L. Campbell, Ser. No. 743,150, filed June 19, 1958, and assigned to the same assignee.

In order to feed the magnetic tape 3 past the heads the capstan 13 is coupled to a motive device such as an electric motor 35 through suitable coupling means 37. The electric motor 35 when energized is designed to operate at a substantially constant speed and may take the form of a conventional synchronous motor. By providing a suitable speed reduction in the coupling 37 the motor 35 may be of a reasonably high-speed type.

If the capstan 13 advances the magnetic tape 3 at a positively uniform rate, it follows that the tape may be provided with markings 39 representative of time.

Timing signals are generated which are magnetically recorded in the magnetic tape 3. This eliminates the need for moving the magnetic tape in an absolutely uniform manner. If the type of timing signal adopted is such that the output of its magnetic record may be readily segregated from the magnetic record of the pulses supplied through the amplifier 29, as by suitable filters or discriminators, the timing signals may be applied to the magnetic head 9 to be recorded in a single track with the pulses supplied by the amplifier 29. However, in preferred embodiment of the invention, a separate set of heads 7*a*, 9*a* and 11*a* are provided which correspond respectively to the heads 7, 9 and 11, but which apply a record to the magnetic tape lying in a second track parallel to and spaced from the track containing the record represented by the pulse positions 33.

The heads 7*a*, 9*a* and 11*a* may be spaced along the magnetic tape 3 from the heads 7, 9 and 11. This permits the adoption of a narrower magnetic tape with adequate mechanical room for the heads. However, it will be assumed that the pairs of heads 7 and 7*a*, 9 and 9*a* and 11 and 11*a* are side by side.

The record head 9*a* may be energized through the switch 23*a* from any source capable of producing periodic pulses representative of time. In FIG. 2, the synchronous motor 35 employed for operating the capstan 13 also is employed for generating the timing signals. To this end a commutator 41 is mounted on the capstan 13 for rotation therewith. This commutator has a conductive bar 41–1 and is generally similar in construction to the commutator 27. Two brushes 41–2 and 41–3 engage the commutator and are connected by the bar 41–1 once for each rotation of the capstan 13. The brushes are connected in series with a suitable source of direct current such as a battery 43 across the input terminals of an amplifier 45. The amplifier may amplify the pulses produced by the commutator 41, provide a conventional recording bias if utilized for the pulses and shape them if so desired. The output of the amplifier is connected to the reproduce head through the switch 23*a*. From the foregoing discussion it is clear that if the magnetic tape 3 is moved by the capstan 13 in the direction shown by the arrow 47, and if the switch 23*a* is closed, a series of pulses will be recorded in the magnetic tape 3. Although these pulses are invisible to the eye, their positions are represented in FIG. 2 by points or bits 48. It will be understood that the distance between each pair of successive points represents a definite period of time.

The components of FIGS. 1 and 2 thus far specifically described are similar to corresponding components shown in the aforesaid Snyder patent. However, FIG. 2 shows provisions for recording on the tape 3 additional tracks of information and reproducing therefrom.

In FIG. 2 a number of components are associated with third and fourth tracks for information on the tape 3. These components bear the same reference characters employed for similar components associated with the first track except that suffixes *b* and *c* are added to the reference characters identified respectively with the third and fourth tracks. Thus an erase head 7*b*, a record head 9*b*, a reproduce head 11*b* and a commutator 27*b* are associated with the third track. An erase head 7*c*, record head 9*c*, a reproduce head 11*c* and a commutator 27*c* are associated with the fourth track.

Although separate heads can be employed, dual heads of a compact nature are available for four-track stereo equipment. Thus two of the four-track stereo heads may be employed in place of four sets of independent heads. One of the stereo heads may be positioned for association with the first and third tracks. The remaining stereo head may be positioned slightly displaced from the first stereo head in the direction of tape movement for association with the second and fourth tracks.

To illustrate suitable parameters for the various components, the magnetic tape may be of conventional construction having a width of ¼-inch. It may be moved past the recording heads at the rate of 2.35 inches for each rotation of the capstan 13. If the capstan is rotated once in each 15-minute interval, it follows that each pair of successive points 48 represents an interval of 15 minutes.

With the parameters thus far discussed, a tape having a length of 600 feet is adequate for operation for a period of one month.

In operation, the magnetic recorder may be connected to the circuit represented by the conductors L1 and L2. After it has been placed in operation it may be left untouched for a period of one month. At the end of this period the magnetic tape may be removed for storage purposes or study and another magnetic tape may be loaded on the payout reel to permit operation for a succeeding month at the same location or at a different location as desired.

Although the magnetic tape preferably is run through a separate reproducing unit, to simplify the description it will be assumed that the tape is run through the same mechanism for reproduction purposes. During such reproduction the magnetic tape may be run at a speed substantially greater than the recording speed by suitable adjustment of the motor 35 and the coupling 37. This materially decreases the time required for reproduction. For reproduction the switches 51 to 51*c* may be closed to connect all or any of the reproduce heads 11 to 11*c* respectively to the amplifiers 53 to 53*c*. The outputs of the amplifiers may be connected to any suitable translating equipment. In actual practice, the outputs of the amplifiers can be supplied to a translator 55, such as a business machine of conventional construction for the purpose of converting the magnetic records stored in the magnetic tape 3 to cards in punched or printed form, or such as a computer for deriving desired information. Once the information has been transferred to cards, or obtained in other manners, the magnetic tape 3 may be demagnetized for further use if so desired.

Let it be assumed that the apparatus illustrated in FIGS. 1 and 2 is to be employed in obtaining information concerning the volt-amperes supplied by the circuit L1, L2, and that the magnetic tape 3 is in an erased condition. The switches 23, 23*a* and 23*b* are closed, and the remaining switches are open.

As the commutator 27 rotates pulses are applied through the amplifier 29 and the switch 23 to the record head 9 at a rate or frequency dependent on the real power PR of the circuit L1, L2. These pulses are recorded as magnetic bits 33 in the tape.

The measuring unit 25*b* has its current windings connected through a double-pole double-throw switch SW3 for energization in accordance with current flowing in the conductor L2 (the switch SW1 is open for this operation). The voltage coil 25*b*–1 is energized in accordance with the voltage of the circuit L1, L2 through a double-pole double-throw switch SW2 and a phase shifter 61 which is adjusted to introduce a 90° phase shift between its input and output for the purpose of rotating the commutator 27*b* in accordance with the reactive power $P_X$ of the circuit L1, L2 in a manner well understood in the art.

Through the amplifier 29*b* and the switch 23*b*, pulses are applied to the record head 9*b* at a rate or frequency dependent on reactive power $P_X$ of the circuit L1, L2, and these are recorded as magnetic bits 33*b* in the tape 3.

During recording operation of the unit, magnetic bits 48 are recorded in the manner previously described to designate time intervals.

At the end of a suitable period, such as one month, the magnetic tape 3 is rerun in the same direction for the purpose of utilizing the recorded information. If it is rerun in the same apparatus shown in FIGS. 1 and 2, the switches 51, 51*a* and 51*b* are closed and the remaining switches are open. The translator 55 is now supplied with pulses from the reproduce head 11 representing real power, pulses from the reproduce head 11*a* representing time intervals and pulses from the reproduce head 11*b* representing reactive power. In some cases the translator 55 is a business machine which records this information in a conventional manner on cards for storage and subsequent use. In other cases, the translator may be a conventional digital-type computer which is arranged in a manner well known in the art to derive from these pulses the volt-amperes $P_{VA}$ as represented by the expression $\sqrt{P_R^2+P_X^2}$. By utilizing the computer to derive the volt-amperes for each interval represented by the bits 48, the volt-ampere maximum demand for any interval over a long period of time may be ascertained.

In a desirable application of the invention the phase shifter 61 is adjusted to rotate the commutator 27*b* in accordance with lagging reactive volt-amperes $P_{X1}$ which are then represented by the bits 33*b*. In addition the commutator 27*c* is operated in the same manner as the commutator 27*b* and has its phase shifter (not shown), which is similar to the phase shifter 61, adjusted to rotate the commutator in accordance with leading reactive volt-amperes $P_{X2}$ of the circuit L1, L2. If the switches 23*c* and 51*c* are then closed, the bits 33*c* represent leading reactive volt-amperes and deliver pulses to the translator 55 through the switch 51*c*. If the translator is a conventional digital computer, it may be arranged in a manner well understood in the art to measure the volt-amperes $P_{VA}$ as represented by the expression $\sqrt{P_R^2+(P_{X1}-P_{X2})^2}$. Such an arrangement is useful in systems wherein both leading and lagging reactive volt-amperes can be encountered.

In a very desirable application of the invention the pulsed outputs controlled by the commutators are totalized. Let it be assumed that the commutator 27 is rotated in accordance with real power P of the electric line L1, L2, that the commutator 27*b* is rotated in accordance with real power P*b* of a second electric line, and that the commutator 27*c* is rotated in accordance with real power P*c* of a third electric line. If a conventional digital computer is employed as the translator 55, it may be arranged in a manner well understood in the art to indicate the total real power $P_T$ of the three lines as represented by the formula:

$$P_T=P+P_b+P_c$$

For this embodiment the switch SW1 is closed. The switch SW2 is operated to the left and the switch SW3 is operated to the right to connect the measuring unit for energization from the second electric line. The commutator 27*c* is similarly associated with the third electric line.

Figure 3:
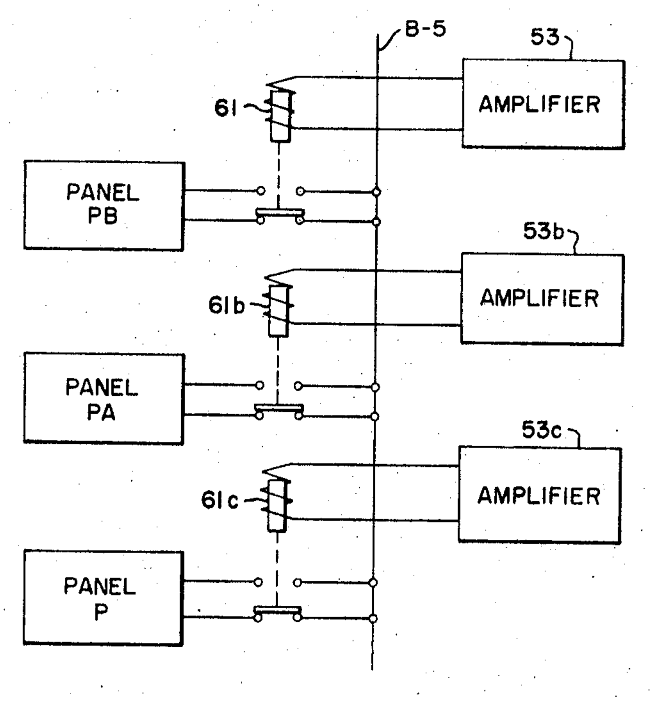
FIG. 3 is a schematic view showing a modification of the recorder of FIG. 1.

In a preferred embodiment of the invention for totalizing, the translator takes the form shown in the Booker patent, 3,072,888, which issued Jan. 8, 1963. In FIG. 3 the input portions of the three panels P, PA and PB and the bus B5 of the Booker patent are shown. In FIG. 3 the inputs for these three panels are derived from the three amplifiers 53*c*, 53*b* and 53 of FIG. 2. Inasmuch as the panels of the Booker patent are arranged for three-wire inputs, the output of each of the amplifiers in FIG. 3 is converted into a three-wire input for one of the panels by a suitable relay which is shown in FIG. 3 in dropped-out condition. For example, when a pulse is delivered by the amplifier 53 a relay 61 picks up to interrupt the connection between the bus B5 and the lower input terminal of the panel PB. The relay then completes a connection between the bus B5 and the upper input terminal of the panel PB. After the pulse terminates, the relay 61 drops out to the condition shown in FIG. 3. Similar relays 61*b* and 61*c* are employed respectively to couple the amplifiers 53*b* and 53*c* to the panels PA and P.

With the inputs to the three panels as shown in FIG. 3 the apparatus of the aforesaid Booker patent operates to totalize the real powers in the three lines associated with the amplifiers 53. 53*b* and 53*c*.

I claim as my invention:

1. The method of ascertaining a combined function of at least three initial quantities each representing a separate function of combined alternating voltage and current utilizing a magnetic storage medium which comprises converting each of said quantities into a plurality of electrical pulses having a frequency dependent on the magnitude of the associated one of said quantities, magnetically recording the pulses for each of the quantities as the pulses occur in a separate track of the magnetic medium as a separate series of magnetic bits, converting each of the separate series of magnetic bits into a corresponding series of a plurality of converted electrical pulses, and mathematically combining the numbers of said pulses occurring during the same time period to provide a resultant quantity dependent on a mathematical resultant of said initial quantities.

2. The method of ascertaining a combined function of at least three initial quantities each representing a separate function of combined alternating voltage and current utilizing a magnetic storage medium, a first one of said initial quantities representing the real power flowing in an alternating electric circuit, a second one of said initial quantities representing the lagging reactive power flowing in the alternating electric circuit and a third one of said initial quantities representing the leading reactive power flowing in the alternating electric circuit, which comprises converting each of said quantities into a plurality of electrical pulses having a frequency dependent on the magnitude of the associated one of said quantities, magnetically recording the pulses for each of the quantities in a separate track of the magnetic medium as a separate series of magnetic bits, magnetically recording timing pulses as magnetic bits in a separate track of the magnetic medium to designate intervals converting each of the separate series of magnetic bits into a corresponding series of a plurality of converted electrical pulses, subtracting the number of converted pulses for a predetermined interval corresponding to the third initial quantity from the number of converted pulses for said interval corresponding to the second initial quantity to provide a difference number of pulses, and mathematically combining said difference number and the number of converted pulses for said interval corresponding to the first initial quantity to provide a quantity representing the volt-amperes flowing in said circuit for said interval.

3. The method of totalizing a plurality of variable quantities utilizing a magnetic storage medium which comprises converting each of said quantities into a plurality of electrical pulses having a frequency dependent on the magnitude of the associated one of said quantities, magnetically recording the pulses for each of the quantities as they occur in a separate track of the magnetic medium as a separate series of magnetic bits, converting each of the separate series of magnetic bits during a common time period into a corresponding series of a plurality of converted electric pulses, and digitally summing said converted electric pulses to provide a resultant indication of the totalized variable quantities.

References Cited

UNITED STATES PATENTS

| | | | |
|---|---|---|---|
| 2,185,038 | 12/1939 | Rowell | 324—113 |
| 2,755,020 | 7/1956 | Belcher | 235—151.3 |
| 2,986,722 | 5/1961 | Williams. | |
| 2,989,697 | 6/1961 | Bilz | 324—113 X |
| 3,059,239 | 10/1962 | Snyder | 346—74 |
| 3,072,888 | 1/1963 | Booker | 340—172.5 |
| 3,114,900 | 12/1963 | Anderson | 235—151.21 X |
| 3,230,516 | 1/1966 | Neergaard. | |
| 3,263,159 | 7/1966 | Albright | 324—1 |

RUDOLPH V. ROLINEC, Primary Examiner

ALFRED E. SMITH, Assistant Examiner

U.S. Cl. X.R.

235—151.21, 151.31; 324—113; 346—74